United States Patent [19]
Dzurkovich et al.

[11] Patent Number: 4,703,583
[45] Date of Patent: Nov. 3, 1987

[54] BAITLESS RODENT TRAP

[76] Inventors: Damon Dzurkovich, 1202 N. Sixth St., Reading, Pa. 19601; Joseph A. Dzurkovich, 920 W. Lancaster Pike, Shillington, Pa. 19607

[21] Appl. No.: 50,873

[22] Filed: May 18, 1987

[51] Int. Cl.⁴ ............................................ A01M 23/00
[52] U.S. Cl. .......................................... 43/82; 43/81; 43/79
[58] Field of Search ..................... 43/61, 77, 79, 81, 82

[56] References Cited

U.S. PATENT DOCUMENTS

| | | |
|---|---|---|
| 1,690,369 | 4/1928 | Harte . |
| 1,709,199 | 4/1929 | Thayer . |
| 2,581,628 | 1/1952 | Borwell ................................. 43/81 |
| 2,669,056 | 2/1954 | Lehman ................................. 43/79 |
| 2,684,553 | 7/1954 | Schroeder ............................. 43/81 |
| 2,869,280 | 1/1959 | Dobratz ................................. 43/77 |
| 3,769,742 | 11/1973 | Spain et al. ........................... 43/81 |
| 4,030,230 | 6/1977 | Souza ..................................... 43/81 |
| 4,127,958 | 12/1978 | Peters et al. .......................... 43/81 |
| 4,418,493 | 12/1983 | Jordan .................................... 43/67 |
| 4,550,524 | 11/1985 | Goebel .................................. 43/75 |
| 4,569,149 | 2/1986 | Sensing ................................. 43/61 |

Primary Examiner—M. Jordan
Attorney, Agent, or Firm—Ruth Moyerman

[57] ABSTRACT

A baitless rodent trap is provided with a removable cartridge and disposable sleeve. A trap member with spring means, trigger, and striker means has a flat base, the base including, on the trigger end, means to receive a removable cartridge. The elongated cartridge includes toroidal collars on opposing ends. A sleeve is provided to stretch between the collars to form a tunnel. The cartridge is then attached to the trap member's base to form a T with the base. The cartridge sleeve is placed along a wall. A rodent enters the tunnel and contacts the concealed trigger which springs the trap. The sleeve or the entire cartridge and sleeve are disposed of with the rodent.

12 Claims, 5 Drawing Figures

BAITLESS RODENT TRAP

BACKGROUND OF THE INVENTION

1. Field of the Invention

This invention relates to animal traps and, more particularly, to a rodent trap.

2. Description of the Prior Art

The control of rodents, particularly in the home, has been a problem for many years. Homeowners are reluctant to use poisons and have had problems with setting traps and with removal of the carcass from the trap. To this end, various mousetraps and rodent traps have been designed which include either disposable trap elements or which hide the trapped animal.

Burwell (U.S. Pat. No. 2,581,628) discloses a mouse and rat trap with an improved bait holder which is an enlarged treadle. The treadle does make it easier to bait the trap, but the user must still remove the dead mouse from under the striker. Sousa (U.S. Pat. No. 4,030,230) uses a conventional mousetrap which is combined with a paper bag. When the mouse sets off the trap, the trap is simultaneously pulled into the bag. Trap and mouse are disposed of without contact by the user. However, baiting Sousa's trap is still a problem.

Others have made traps of box-like configurations. Various means are used to trap the animal inside the box and to kill it with strikers which operate from the sides and tops of the boxes. Harte (U.S. Pat. No. 1,690,369) uses a box to enclose the bait only. Schroeder (U.S. Pat. No. 2,684,553) discloses a rodent trap in which striker means is inside a box. Goebel's trap (U.S. Pat. No. 4,550,524) uses a movable partition to trap a rodent in a chamber. Most of these require complex assembly and the use of bait.

Some traps are designed to be at least partially disposable. Among these, Jordan (U.S. Pat. No. 4,418,493) uses a system of interconnected modular units to trap an animal and includes a sealed capture module with a disposable liner. Sensing et al (U.S. Pat. No. 4,569,149) discloses a disposable mousetrap which catches the mouse in a disposable box. Dobratz (U.S. Pat. No. 2,869,280) shows a disposable mousetrap in which the breaking of the bait inside a box causes the striker to be released from the sides of the box. Lehman (U.S. Pat. No. 2,669,056) shows a plunger assembly inside a container which hides the carcass from view so that it can then be disposed of without the user touching the animal. Thayer (U.S. Pat. No. 1,709,199) shows a conventional mousetrap including on one trap end a paper bag open at one bag end. The bag is supported by a vertical wall on the trap and with a wire loop. The bag is set head-on to the trap to elongate the trap. Bait is used and the spring mechanism has additions to make it larger. A stiff bag is necessary and the rodent enters from only one end.

None of the prior art shows a baitless mousetrap with disposable elements to solve the dual problems of premature springing of the trap when setting the bait, and easy and clean removal of animal remains.

SUMMARY OF THE INVENTION

The aforementioned prior art problems are obviated by the mousetrap of this invention in which a trap member is combined with a cartridge to provide disposal means. The trap member includes a preferably rectangular base with side edges and opposing ends. A striker is pivotably secured to the center of the base and is held in set position by latching means at one base end. A trigger at the other base end is operatively connected to the latching means and springs the striker when an animal contacts the trigger. An elongated cartridge is, preferably, slidably connected to the trigger end of the trap base to form a T with the trap member. The cartridge has a base, two ends fitted with facing toroidal collars, and a disposable sleeve which fits over and between the collars. When the cartridge is in position, the sleeve covers the trigger. When a mouse or other rodent enters the sleeve from either collar end, the rodent contacts the trigger and operates the striker. The sleeve and animal are disposed of together by disengaging the sleeve from the collar, the user never touching the carcass. In another embodiment, the entire cartridge may be removed.

In use, the trap may be placed against a wall to take advantage of the rodent's natural instinct to walk close to the edge of a wall. The rodent will enter the cartridge sleeve from one collar end. There is no need to place bait in the trap, since the trap is in the rodent's natural path. Thus, the problem of premature springing of the trap on the user's fingers while setting the bait is avoided with use of this baitless trap. The second problem, that of of disposal of animal remains, is also solved by the mousetrap of this invention.

It is, therefore, an object of this invention to provide a baitless rodent trap with disposal means which does not require the user to touch the rodent.

It is another object of this invention to provide a rodent trap with a cartridge at one trap end to receive the rodent.

It is yet another object of this invention to provide a rodent trap which eliminates the use of smelly and messy bait.

It is a further object of this invention to provide a rodent trap with a disposable rodent-receiving cartridge.

It is still a further object of this invention to provide a rodent trap with a disposable sleeve.

It is yet a further object of this invention to provide a rodent trap which hides the rodent from view and which does not require the user to touch the animal remains.

It is still another object of this invention to provide a rodent trap which utilizes the rodent's natural habits to trap the animal.

It is yet another object of this invention to provide a rodent trap which is sanitary and clean to use, time after time, because there is no bait and no animal remains touch the trap itself.

These and other objects will be more readily ascertainable to one skilled in the art from a consideration of the following Figures, description and exemplary embodiments.

BRIEF DESCRIPTION OF THE DRAWING(S)

DETAILED DESCRIPTION OF THE PREFERRED EMBODIMENT(S)

Figure 1:
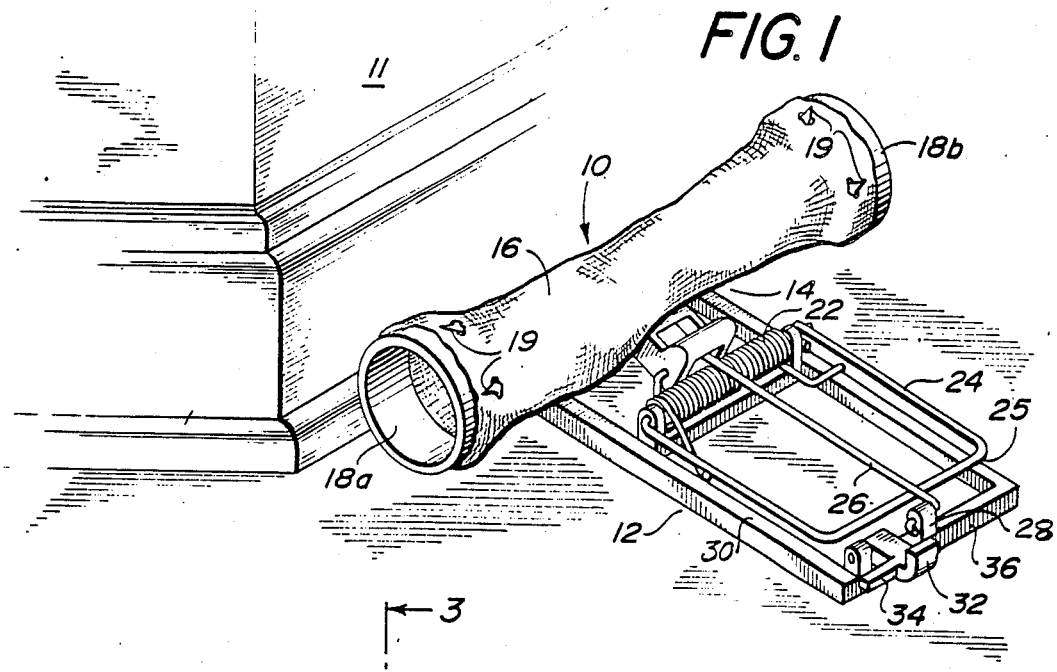
FIG. 1 is an isometric view of the rodent trap of this invention in position against a wall.

Referring now to the drawings, and more particularly to FIG. 1, rodent trap 10 of this invention is seen in place against wall 11. Rodent trap 10 has two sections, trap member 12 and cartridge member 14. Trap member 12 is seen to have base 30 and striker 24 rotatably held in spring 22 and latched in latch 28 by holder 26. Base 30 has base first end 36 and base second end 38 (see in in FIG. 2). Cartridge 14, attached to trap base end 38, is seen to have toroidal collars 18a and 18b and sleeve 16 which, in this view, obscures base end 38 ot trap member 12. Sleeve 16 forms a tunnel into which the rodent walks from either collar end. In the preferred embodiment, sleeve 16 is caught and removably held on collars 18a and 18b by hooks 19 which extend outward from collars 18a and 18b.

In use, trap 10 is placed near wall 11 so that the length of cartridge 14 is parallel to wall 11, cartridge 14 open at both collars 18a and 18b. A mouse (or other rodent) enters the tunnel by sleeve 16 and collars 18a and 18b from either cartridge end. When the animal steps onto trigger 40 (hidden in this view by sleeve 16 but seen in FIG. 2), holder 26 is released from latch 28 freeing striker 24 to rotate rapidly in spring 22, changing from set position at base first end 36 to sprung position at base second end 38. A householder may then remove sleeve 16 from collars 18a and 18b to dispose of mouse and sleeve without touching the mouse itself. In the preferred embodiment of the invention, cartridge member 14 is also removable so that cartridge 14, sleeve 16, and rodent are disposed of together without the user touching the rodent.

Figure 2:
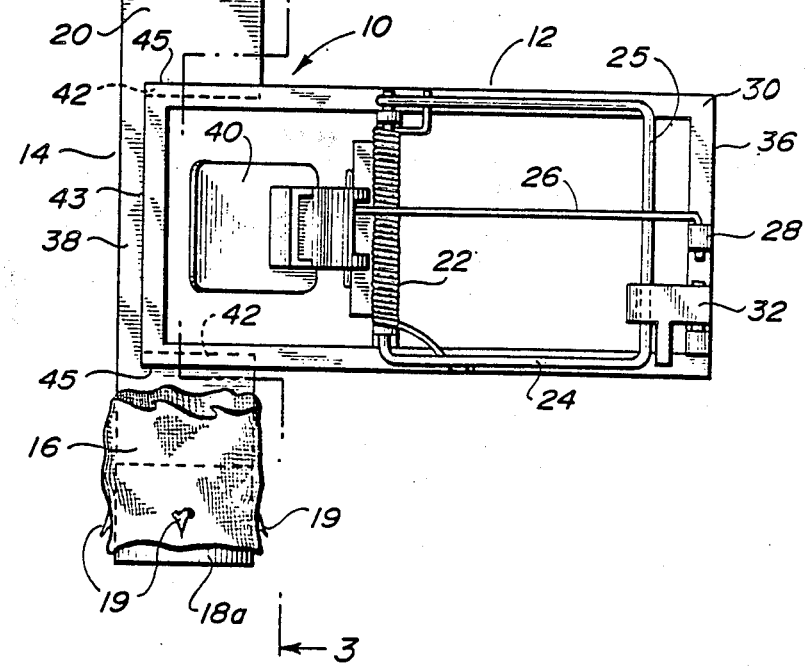
FIG. 2 is a top view of the rodent trap with a portion of the sleeve cut-away to expose the trap member's end.

Also seen in FIG. 1 is safety catch 32. During moving and positioning of rodent trap 10, catch 32 is slipped over crossbar 25 of striker 24 (as seen in FIG. 2) to prevent striker 24 from releasing prematurely and striking the user's fingers. This position is illustrated in FIG. 2. Once rodent trap 10 is positioned along wall 11, the user, grasping handle 34, flips safety catch 32 into the position illustrated in FIG. 1.

Thus, FIG. 1 illustrates the solution to two of the prior art problems with rodent traps. First, easy and sanitary disposal of animal remains is provided by disposable sleeve 16 and removable cartridge 14. Second, safe and easy setting of the trap is provided because no bait is required and safety catch 32 prevents premature springing of the trap on the user's fingers.

Now referring to FIG. 2, a top view of rodent trap 10 illustrates positioning of cartridge 14 on trap member 12. Trap member 12 is seen to have base 30 with base first end 36 and base second end 38. Striker 24 is seen rotatably mounted in spring 22, striker crossbar 35 held in set position by holder 26 in latch 28 and safety catch 32. Trigger 40 is seen at base end 38.

Cartridge 14 is seen on trap base end 38. Cartridge base 20 is seen to have collars 18a and 18b and a U-shaped cut-away section formed by back 43 and sides 45. Protruding arms 42 face each other on opposing sides 45. Trap member base 30 is seen slidably received in the U-shaped cut-away. Sleeve 16 (only partially shown in FIG. 2 to expose base end 38) is seen firmly held on collar 18a by hooks 19. Attachment of cartridge 14 to trap member 12 is seen better in FIGS. 3 and 4.

It should be noted that trigger 40 covers at least half of the width of base 30. A rodent walking through sleeve 16 is unable to avoid putting weight on at least a portion of trigger 40 to spring trap 10. No messy bait is necessary with trap 10. Sleeve 16 alone provides enticement to the rodent, relying on the animal's natural instinct to enter small dark passages. Since no bait is necessary, trigger 40 is preferably rather large and flat with no protrusions to catch on sleeve 16 or to become soiled. If the entire cartridge 14 is removed and disposed of, as is preferred, the user touches neither messy bait nor the animal's remains.

Figure 3:
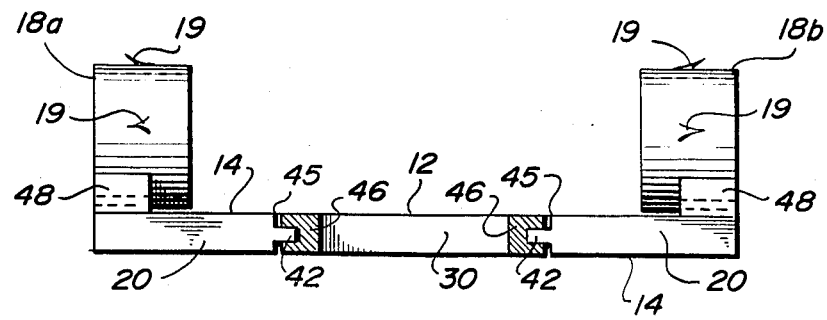
FIG. 3 is a cross section, taken on lines 3—3 of FIG. 2, showing the attachment of the removable cartridge to the trap base.

Now referring to FIG. 3, a cross section of trap 10, taken on lines 3—3 of FIG. 2, illustrates the slide fit of cartridge 14 to trap member 12. Cartridge 14 is shown with collars 18a and 18b which each have hooks 19. Base 20 is seen to have facing arms 42 extending from sides 45 of the U-shaped cut-away seen in FIGS. 2 and 5. Base 30 of trap member 12 is seen to have slotted areas 46 which receive arms 42 of cartridge 14. Whether made of plastic, as is preferred, or of wood or metal, cartridge 14 easily slides onto base 30 and is easily removed when an animal has been trapped.

Figure 4:
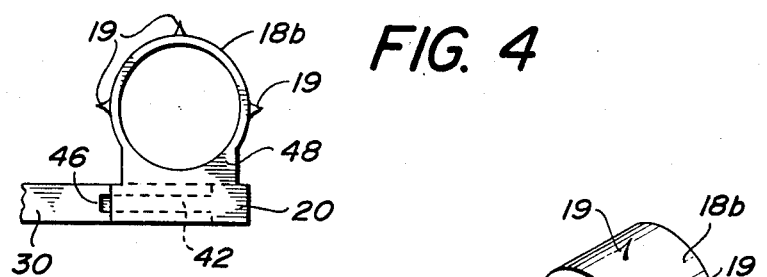
FIG. 4 is an end view, taken on lines 4—4 of FIG. 2, to illustrate the cartridge collar.
Figure 5:
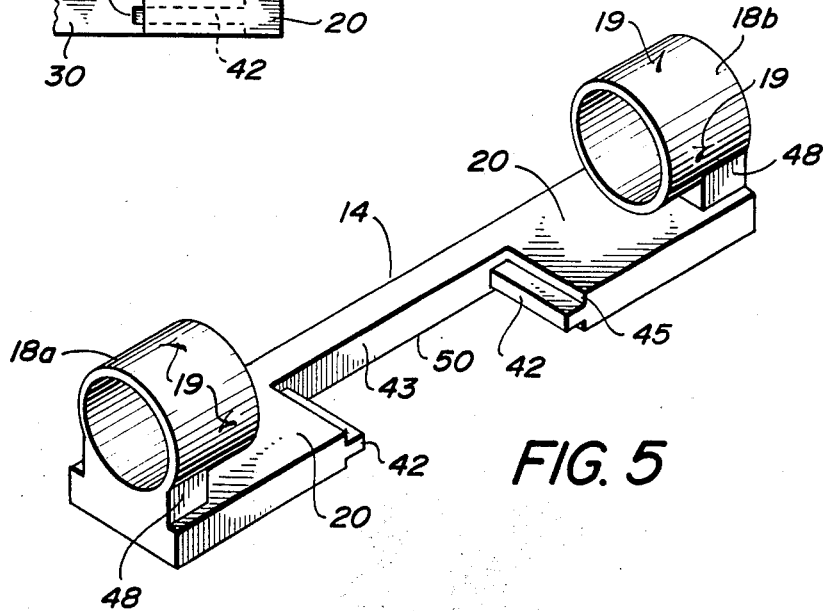
FIG. 5 is an isometric view of the cartridge with the sleeve removed.

Also seen in FIG. 3 on cartridge 14 are pedestals 48 (detailed in FIGS. 4 and 5). Pedestals 48 raise collars 18a and 18b above the surface of base 20 so that sleeve 16 can be readily slipped onto collars 18a and 18b.

Now referring to FIG. 4, a partial end view shows collar 18b with hooks 19 extending outward to retain a sleeve 16. Arm 42 is seen received in the slot area 46 of base 30. Pedestal 48 is holding collar 18b above the surface of bases 20 and 30.

Now referring to FIG. 5, cartridge member 14 is shown in an isometric view. Removable cartridge 14 has base 20 with U-shaped cut-away section 50. Section 50 has back wall 43 and side walls 45 from which arms 42 protrude. Back wall 43 is of a width to closely receive the entire width of base second end 38 of trap member 12 (Seen in FIGS. 1, 2, and 3). At the ends of base 20 are toroidal collars 18a and 18b which are supported by pedestals 48. Extending outward from collars 18a and 18b are hooks 19. It is preferable that the entire cartridge 14 be disposable. But it is also possible to keep cartridge 14 mounted to trap member 12 and dispose of only sleeve 16.

There are several variations which can be practiced in the scope of this invention. First, cartridge 14 may be permanently mounted to trap member 12, or it may be disposable.

Second, the materials of construction are preferred to be heavy duty plastic for either or both cartridge and trap members, but other materials such as inexpensive woods and metals are within the scope of this invention.

Safety catch 32 is provided for the user's protection, but it is within the scope of this invention to eliminate safety catch 32.

While hooks 19 are shown as an aid to mount and hold sleeve 16, some sleeve materials may not require this addition. Alternately, other means may be employed to anchor the sleeve and still be within the scope of this invention.

Lastly, although sleeve 16 is preferably an elastomeric fabric, any fabric, including paper, is within the scope of this invention.

There are many advantages to the mousetrap of this invention. Chiefly, it allows a user to safely and sanitarily use a rodent trap without touching messy bait or animal remains.

Second, the rodent trap of this invention takes advantage of the rodent's natural instinct to enter small dark cavities, and thus eliminates the need for bait.

Third, the rodent trap of this invention includes a safety catch which prevents premature springing of the trap.

Having now illustrated and described my invention, it is not intended that such description limit this invention, but rather than this invention be limited only by reasonable interpretation of the appended claims.

What is claimed is:

1. A baitless trap for rodents comprising:
   (a) a trap member including:
      (i) a flat base having an upper surface, side edges, and first and second opposed ends;
      (ii) a wire striker pivotably secured to said upper surface of said base intermediate said base's ends for rotation betweena set position and a sprung position;
      (iii) a spring normally biasing said striker towards said spring position;
      (iv) latching means at said base's first end for temporarily securing said striker in said set position;
      (v) a trigger at said base's second end operatively connected to said latching means for springing said striker when an animal contacts said trigger;
   (b) a generally elongated cartridge member including:
      (i) an elongated flat base with two ends, said cartridge base attached at a right angle to said trap base's second end to form a T with said trap member;
      (ii) a pair of facing toroidal collars mounted to said cartridge base's ends; and,
      (iii) a disposable fabric sleeve sized to overfit said collars and extend therebetween to form a tunnel and cover said trigger,
   whereby when a rodent enters said tunnel from one collar end and contacts said trigger by walking in said tunnel, said striker means is released to be rotated into said sprung position, striking said rodent inside said tunnel, said sleeve and rodent together thereafter being discarded.

2. The baitless rodent trap according to claim 1, including, additionally, a rotatable safety catch on said trap member base's first end, said safety catch being generally L-shaped and of a predetermined length such that when said catch is rotated towards said trap member base's second end, said L's short leg hooks over said striker to hold it down while positioning said trap.

3. The baitless rodent trap according to claim 2 including, additionally, a handle on said safety catch to aid in lifting said catch.

4. The baitless rodent trap according to claim 1 wherein each said cartridge collar includes means to secure said sleeve to said collar.

5. The baitless rodent trap according to claim 4 wherein said means to secure said sleeve to said collar is a plurality of outwardly pointed hooks on said collar's outer circumference.

6. The baitless rodent trap according to claim 1 wherein said trap member base includes slots on each of its side edges at said base's second end and said cartridge member includes a pair of protruding arms, one each on the inner edges of said cartridge member's U-shaped cut-away sides, to slidably mate with said trap member slots, so that said cartridge member is removably attached to said trap member.

7. The baitless rodent trap according to claim 1 wherein each said toroidal collar includes a pedestal on said cartridge base on which said collar is mounted so that said sleeve slips between said collar and said base.

8. A baitless trap for rodents comprising:
   (a) a trap member including:
      (i) a flat base having an upper surface, side edges, and first and second opposed ends, said side edges including lengthwise slots at said base's second end;
      (ii) a wire striker pivotably secured to said upper surface of said base intermediate said base's ends for rotation between a set position and a sprung position;
      (iii) a spring normally biasing said striker towards said sprung position;
      (iv) latching means at said base's first end for temporarily securing said striker in said set position;
      (v) a trigger at said base's second end operatively connected to said latching means for springing said striker when an animal contacts said trigger;
   (b) a generally elongated cartridge member removably attached at a right angle to said trap base's second end to form a T with said trap member, said cartridge including:
      (i) an elongated, flat base with sides and two ends and a mid section U-shaped cut-away intermediate said cartridge ends, the back of said cut-away being approximately the width of said trap member base, the sides of said cut-away including protruding arms sized to be received in said slots in said trap member's base;
      (ii) a pair of facing toroidal collars mounted to said cartridge base ends; and,
      (iii) a disposable fabric sleeve sized to overfit said collars and extend therebetween to cover said trigger and form a tunnel,
   whereby when a rodent enters said tunnel from one collar end and contacts said trigger by walking through said tunnel, said striker means is released to be rotated into said sprung position, striking said rodent inside said tunnel, said cartridge and rodent together thereafter being discarded.

9. The baitless rodent trap according to claim 8 wherein each said cartridge collar includes means on its outer circumference to secure said sleeve to said collar.

10. The baitless rodent trap according to claim 8 wherein said cartridge is constructed of plastic.

11. The baitless rodent trap according to claim 8 wherein said trap member's base includes, additionally, a rotatable safety catch on said trap base's first end, said safety catch generally L-shaped and of a length that, when said catch is rotated towards said trap member's trigger end, said L's short leg hooks over said striker to hold it down while positioning said trap.

12. The baitless rodent trap according to claim 11 including, additionally, a handle on said safety catch to aid in lifting said catch.

* * * * *